United States Patent [19]

Silver et al.

[11] Patent Number: 4,748,644
[45] Date of Patent: May 31, 1988

[54] METHOD AND APPARATUS FOR A CONSTANT FREQUENCY CLOCK SOURCE IN PHASE WITH A VARIABLE FREQUENCY SYSTEM CLOCK

[75] Inventors: Robert T. Silver, Marlborough, Mass.; William A. Samaras, Seabrook, N.H.

[73] Assignee: Digital Equipment Corporation, Maynard, Mass.

[21] Appl. No.: 823,729

[22] Filed: Jan. 29, 1986

[51] Int. Cl.[4] .................. H03D 3/24; H04L 23/00
[52] U.S. Cl. .................................. 375/120; 375/121; 331/18
[58] Field of Search ............... 375/120, 121; 377/39; 331/18

[56] References Cited

U.S. PATENT DOCUMENTS 3,621,451 11/1971 Yokoyama ........................ 331/11
3,870,970 1/1974 Chibana ........................... 331/25
4,030,045 6/1977 Clark ................................ 375/120

FOREIGN PATENT DOCUMENTS 8502275 5/1985 PCT Int'l Appl. .

OTHER PUBLICATIONS

"Real Time Clock Module Programmable for Different System Clock Inputs"; Orr; IBM Tech. Dis. Bulletin; vol. 26, No. 3B; pp. 1643-1644, Aug. 1983.
"High Speed Programmable Clock Generator"; Koennecker; IBM Tech. Dis. Bulletin; vol. 27, No. 4B, pp. 2509-2510; Sep. 1984.

Primary Examiner—James J. Groody
Assistant Examiner—Michael D. Parker
Attorney, Agent, or Firm—William W. Holloway; Maura K. Moran

[57] ABSTRACT

A clock apparatus provides variable frequency system clock signals for synchronizing the operation of data processing apparatus and constant frequency timing signals, in phase with the system clock signals, for controlling the operation of an interval timer or related apparatus. The variable frequency system clock signals are produced by placing a controllable divider network in the phase locked loop. The input signals to the controllable divider network are distributed as the system clock signals. The constant frequency is obtained by distributing count signals from the controllable divider network of the phase locked loop circuit to a plurality of comparator circuits and output signals from the comparator provide a multiplicity of timing intervals that result in the constant frequency signals. The timing intervals are determined by the control signals that are applied to controllable divider network and to a plurality of divider circuits associated with the comparator circuits. The control signal is divided by the divider circuit and the resulting value entered in the comparator circuit where the value is compared with the count from the controllable divider network. A distribution network, used to provide a delay in the distribution of the system clock signals, thereby synchronizing components of the data processing system, is placed in the phase locked loop to insure that the signal to the constant frequency signals and the system clock signals are in phase.

18 Claims, 4 Drawing Sheets

METHOD AND APPARATUS FOR A CONSTANT FREQUENCY CLOCK SOURCE IN PHASE WITH A VARIABLE FREQUENCY SYSTEM CLOCK

BACKGROUND OF THE INVENTION

1. Field of the Invention

This invention relates generally to the apparatus for producing the timing signals in a data processing system and, more particularly, to data processing systems that have a system clock with a variable frequency and require a constant frequency clock source to control the operation of interval timers and related apparatus.

2. Description of the Related Art

A data processing system generally has a plurality of components that must cooperate in the processing of digital signal groups. An example of such a data processing system is shown in FIG. 1. In this data processing system, at least one central processing unit 10 (or 11), at least one input/output unit 13 (or 14) and a memory unit 15 are coupled by means of a system bus 19. A console unit 12 can be coupled to the central processing unit(s). The central processing unit manipulates groups of logic signals, representing data information, according to control signals in the form of groups of logic signals representing instructions. These instructions are typically components of software or firmware programs. The memory unit provides the principal mechanism for storage of data signal groups and program signal groups to be manipulated by the central processing unit(s). The console unit can provide for the initialization of the data processing system and, during the operation of the data processing system, can function as a terminal. The console unit is frequently used for the control of diagnostic procedures for the data processing system. The input/output unit 13 provides the interface for exchange of signal groups between the data processing system and mass memory storage units, terminal devices, communication devices, and other peripheral devices requiring interaction with the central processing unit(s).

The components of the data processing system must be coordinated in order to provide consistent performance. This coordination is typically performed by a timing or clocking mechanism. For asynchronous data processing systems, individual components of the data processing system can have associated clocking mechanisms. For asychronous data processing systems, interface units are required to insure the integrity of the data signal groups during the exchange of signal groups between the individual components. For synchronous data processing systems, the entire data processing system can have a single system clock by which means the flow of data signal groups throughout the entire data processing system can be coordinated.

It can be desirable to provide a system clock that can provide signals having a variable frequency. The variable frequency signals can permit the rate of processing of the logic signal groups to be increased, as the frequency of the system clock is increased, or to be decreased, as the frequency of the system clock is decreased. This functionality can be particularly advantageous in the detection of system malfunctions because the system can be operated at a rate that can permit the detailed analysis of particular processing functions. This functionality can also be used to increase the power of the entire data processing system when a component or unit, limiting the frequency of the system, can be replaced with an improved component or unit that can operate at an increased frequency.

In addition to the system clock, data processing systems typically include an interval timer. The function of the interval timer is to provide timing signals that are fixed in frequency and can therefore be used to provide real time measurements for such purposes as maintaining a calendar, measuring time for project execution, supplying billing information, etc. The interval timer must be driven by a constant frequency clock source even though the system clock can have a variable frequency. Furthermore, the timing signals used by the interval timer must be maintained in phase synchronization with the signals of the system clock. It has been known in the related art to provide two reference frequency oscillators. The output signals of the first oscillator can be processed in a predetermined manner to provide the constant frequency signal source, while the output signals from the second oscillator can be processed in a controllable manner to provide the variable frequency signal source. This technique suffers from the difficulty in synchronizing the two sets of signals and insuring that the two sets of signals are in phase.

A need has therefore been felt for a clocking apparatus that can provide signals used for system clocking purposes that have a controllable frequency, while simultaneously providing constant frequency signals for the system interval timer and related apparatus that are in phase with the system clock signals.

SUMMARY OF THE INVENTION

It is an object of the present invention to provide an improved data processing system.

It is another object of the present invention to provide a system clocking device that has a controllable frequency.

It is a still further object of the present invention to provide clock signals having a constant frequency for use with a data processing system interval timer and related apparatus.

It is yet another object of the present invention to provide controllable frequency system clock signals for a data processing system while providing constant frequency signals, in phase with the system clock signals, for use with an interval timer or related apparatus.

It is a more particular object of the present invention to provide a phase locked loop circuit, using a controllable divider circuit in the feedback path, to supply variable frequency system clock signals.

It is another particular object of the present invention to utilize a plurality of comparison circuits coupled to a count signal from a controllable divider circuit to provide a series of signals defining generally constant time intervals.

The aforementioned and other objects are accomplished, according to the present invention, by utilizing a reference oscillator to provide constant frequency signals driving a phase locked loop circuit. The variable frequency signals are produced by dividing the output signal of the voltage controlled oscillator in a controllable divider circuit before applying the feedback signal to the phase comparator unit of the phase locked loop unit. The input signal to the controllable divider is the signal used as the basis for the the system clock signals. The input signal to the phase comparator unit will have the same frequency as the signal from the reference oscillator. Comparison circuits compare the count in the controllable divider circuit with calculated fractions of a stored integer, the stored integer representing the system clock frequency. The output signals, resulting when any one of these calculated fractions of the system clock frequency in the comparison circuit are equal to the count from the controllable divider circuits, provide a constant frequency signal, the frequency being a multiple of the reference frequency. This constant frequency signal can be used to control an interval timer or related apparatus. To insure that the controllable frequency signals and the constant frequency signals are in phase with the system clock signals applied to the units of the data processing system, the distribution network, standardizing the delay in the distribution of the system clock signals, is placed in the feedback portion of the phase locked loop, thereby assuring that two sets of signals are in phase.

These and other features of the present invention will be understood upon reading the following description along with the drawings.

DETAILED DESCRIPTION OF THE PREFERRED EMBODIMENT

1. Detailed Description of the Figures

Figure 1:
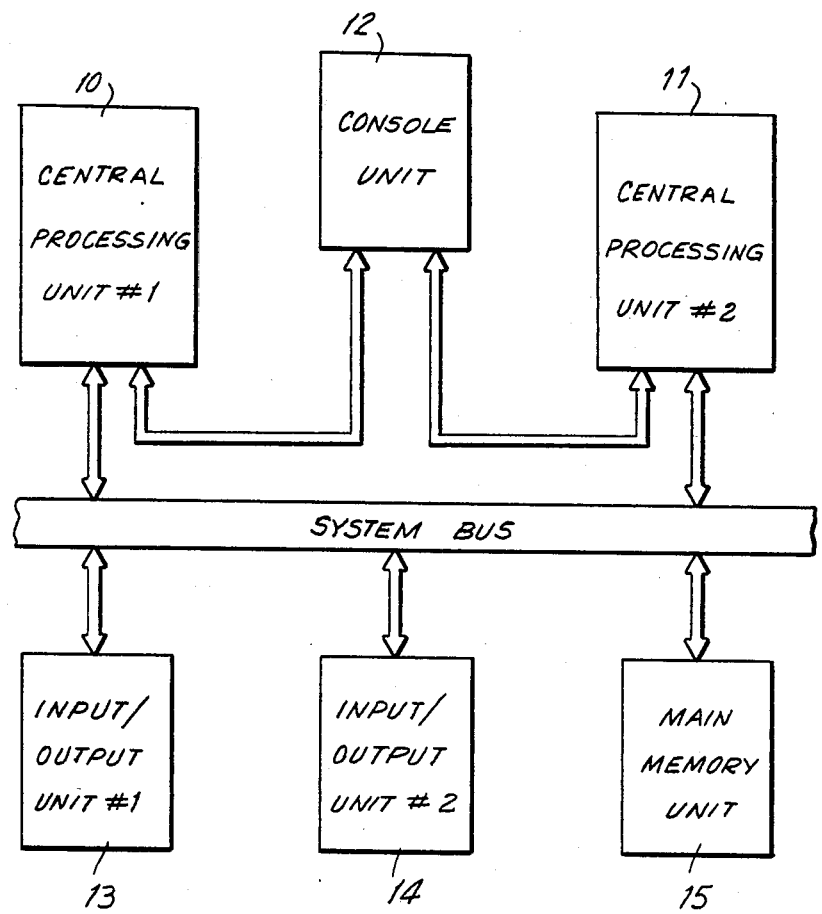
FIG. 1 is a block diagram of a typical data processing system.

FIG. 1 has been described previously in relation to the related art.

Figure 2:
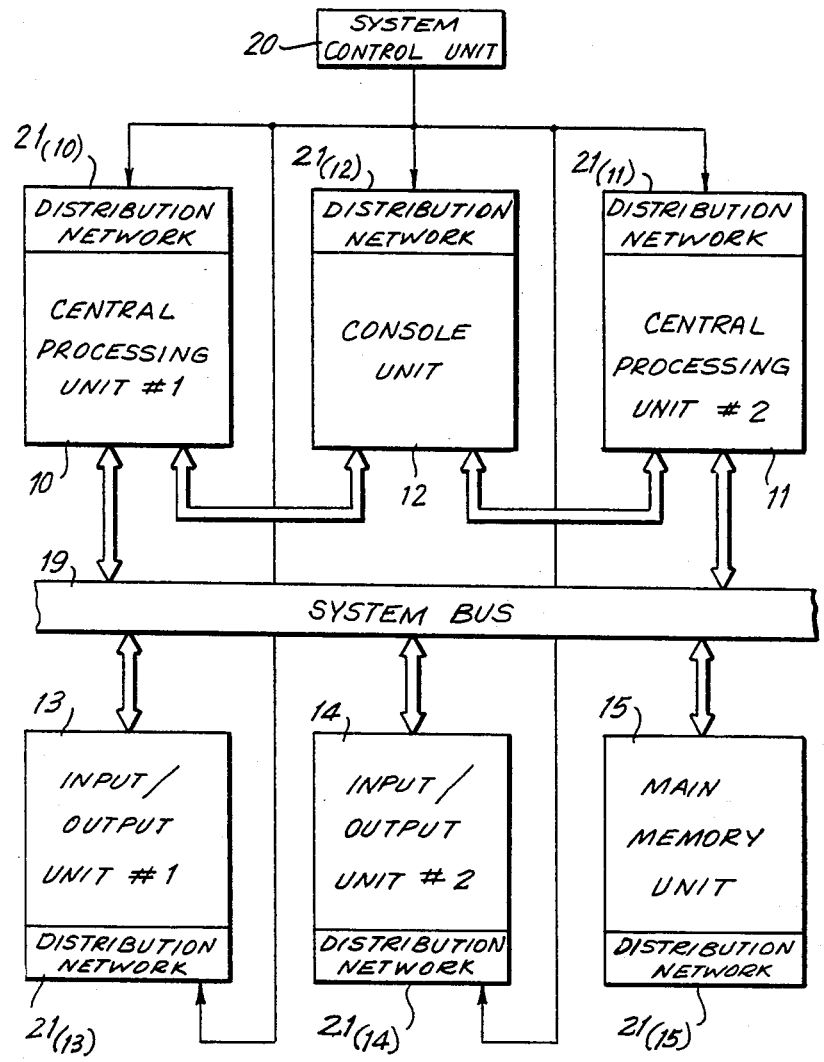
FIG. 2 is a block diagram of a typical data processing system illustrating the use of a system clock to synchronize the operation of the system.

Referring next to FIG. 2, a typical data processing system is illustrated with the system control unit 20 including the system clock specifically designated. The system control unit 20 can be physically located in any portion of the data processing system although the usual location of the system control unit 20 is associated with one of the central processing units. The signals from the system control unit 20 are distributed to the various components of the data processing system. However, the variable length of the cables coupling the system can provide delays for signals transmitted there over that can result in signal processing errors. In order to insure that the operation of all of the units of the data processing system are synchronized, a signal distribution network 21 is placed in each signal path, including the signal path to the components of the unit with which the system control unit 20 is associated, so that a constant signal delay is found to each unit. Because the distance that a signal travels from the system control unit 20 can be different for each unit of the data processing system, and because the interfacing circuits receiving the system clock signals can be different for each unit, each distribution network $21_{(xx)}$ must be implemented to insure that the system clock signals are synchronized in each physically separated unit (xx) of the data processing system.

Figure 3:
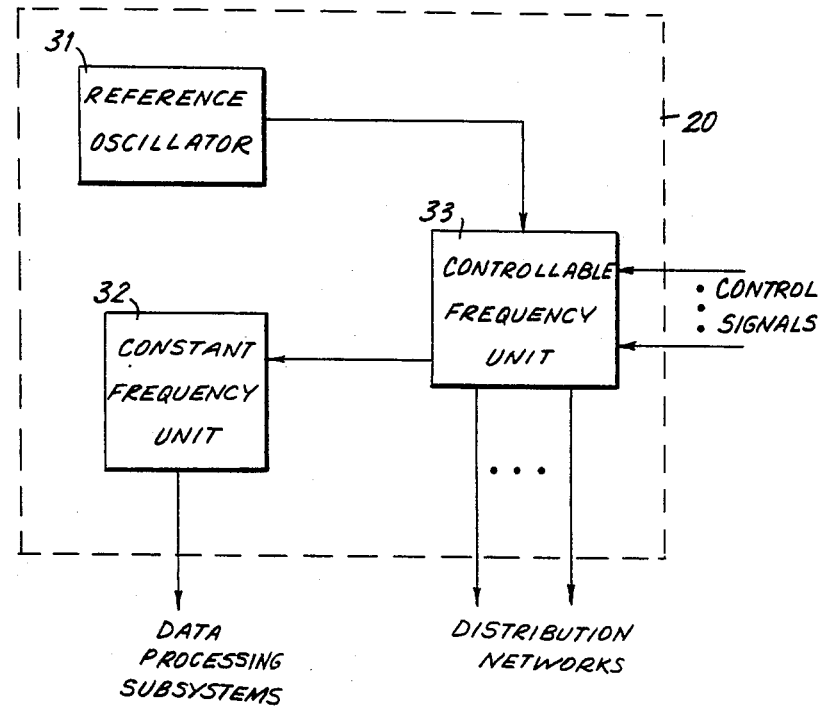
FIG. 3 is a block diagram of a device for producing variable frequency system clock signals that can control the operation of a data processing unit or system and can provide constant frequency signals.

Referring next to FIG. 3, the functional organization of the clock signal device system control unit 20 of the present invention is shown. A reference oscillator 31 provides a signal having a fixed frequency. The signal from the reference oscillator 31 is applied to controllable frequency unit 33. Controllable frequency unit 33 also receives control signals that are used to determine the frequency of the output signals of controllable frequency unit 33. The output signals from the controllable frequency unit 33 are applied to the distribution networks $21_{(xx)}$ and to the constant frequency unit 32. The constant frequency unit 32 applies the signals necessary to drive the interval timer circuit of the data processing system and related apparatus, while the signals to the distribution networks 21 provide the clocking signals coordinating the operation of the component units of the data processing system.

Figure 4:
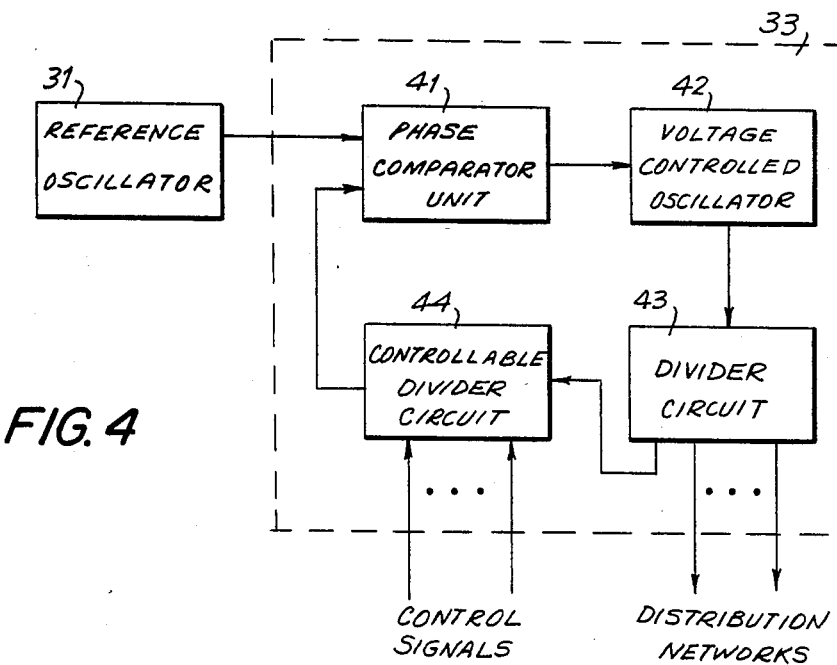
FIG. 4 is a block diagram of the device for producing variable and constant frequency signals for use in a data processing system using a phase locked loop circuit.
Figure 5:
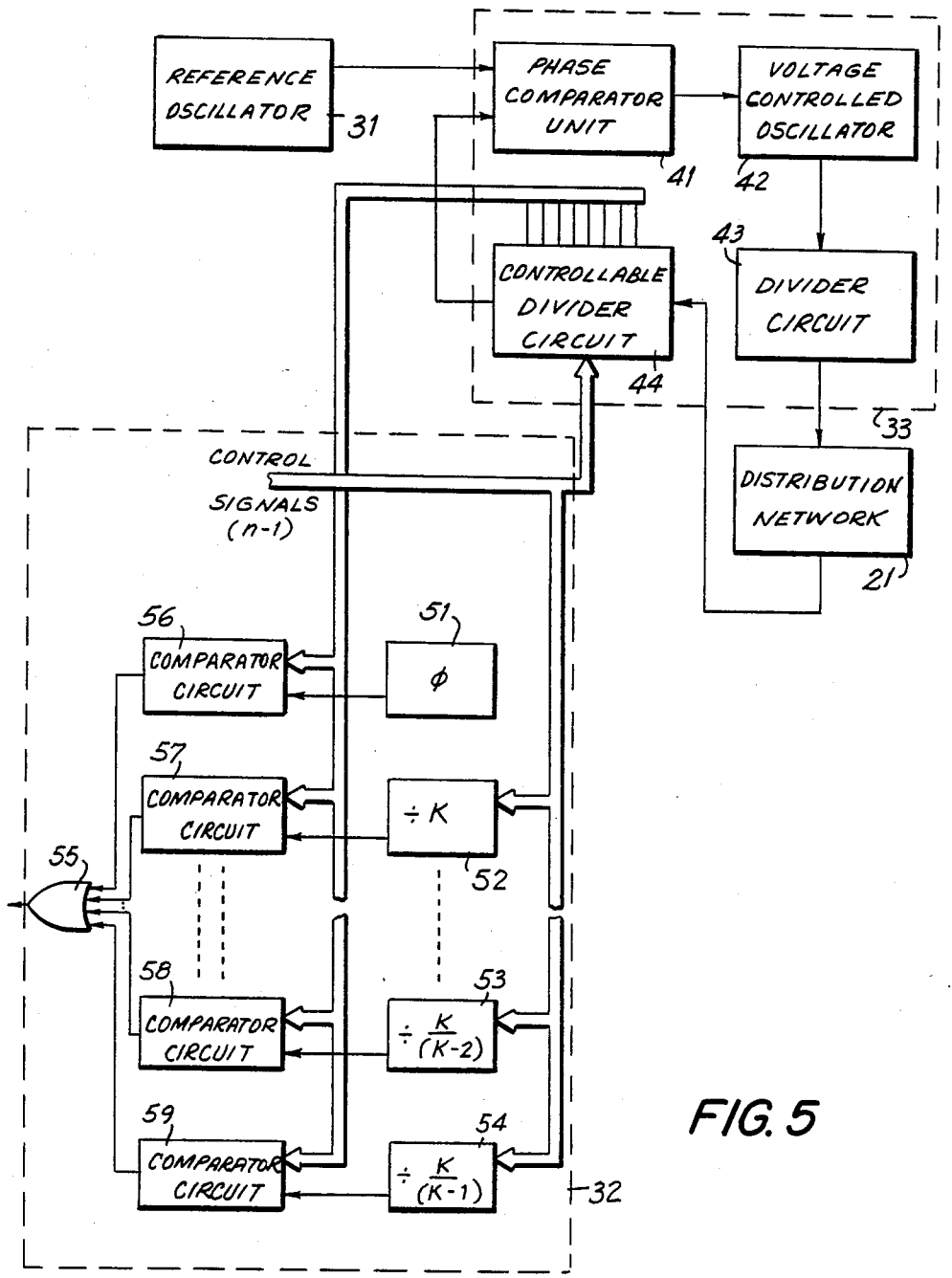
FIG. 5 is a block diagram of the clocking device that can provide controllable frequency signals for synchronizing the operation of the data processing unit, while providing constant frequency signals in phase with the controllable frequency system clock signals.

Referring next to FIG. 4, a detailed block diagram of the controllable frequency unit network 33 is shown. The controllable frequency unit 33 includes a phase locked loop circuit. The output signal from the reference oscillator 31 is applied to a first input terminal of a phase comparator unit 41. The output signal of the phase comparator unit 41 has a voltage level determined by a difference in phase between the two input signals applied to the phase comparator unit 41. This output signal is applied to the input terminal of a voltage controlled oscillator 42, the amplitude of this input signal determines the frequency of the signal at the output terminal of the voltage controlled oscillator 42. The output signal of the voltage controlled oscillator 42 is applied to a divider circuit 43 that divides the frequency of the output signal of the voltage controlled oscillator 42 by a fixed amount. The output signal of the divider circuit 43 is applied to controllable divider circuit 44. The controllable divider circuit 44 receives control signals and these control signals determine the amount by which the frequency of the signal between the input and the output terminals of the controllable divider circuit 44 is reduced. The controllable divider circuit 44 can be implemented by a count down counter in which the number by which the input frequency is to be divided is determined by a number, (n−1) where n is the divisor, and is entered in the count down counter (controllable divider circuit 44). The output signal of the controllable divider circuit 44 is applied to a second input terminal of the phase comparator unit 41. It will be clear that output signal of the voltage controlled oscillator 42 will have a frequency that is the frequency of the reference oscillator 31 multiplied by the divisor of the divider circuit 43, this quantity then multiplied by the divisor of controllable divider circuit 44. The output signal of divider circuit 43 is applied to the distribution networks $21_{(xx)}$ for distribution to the components of the data processing unit and to the constant frequency unit 32 Referring next to FIG. 5, the controllable frequency unit 33 is shown along with the components of the constant frequency clock source 32. According to this embodiment, the output signal of the divider network 43 is applied to the distribution networks $21_{(xx)}$. An output signal from one of the distribution networks $21_{(xx)}$ is used as the input signal to the controllable divider circuit 44. Count signals, indicative of the count in the controllable divider circuit, are applied to an input terminal of a divide-by-K unit 52, to an input terminal of a divide-by-K/(K−2) unit 53, to an input terminal of a divide-by-K/(K−1) unit 54 and to intervening divider units not explicitly shown in the Figure. The output terminal of the divider unit 51 is coupled to a first input terminal of comparator circuit 56, the output terminal of divider unit 52 is coupled to a first input terminal of comparator circuit 57, the output terminal of divider unit 53 is coupled to a first input terminal of comparator circuit 58 and the output terminal of the divider unit 54 is coupled to a first terminal of comparator circuit 59. The second input terminals of comparator circuit 56, comparator circuit 57, comparator 58 and comparator 59 are coupled to terminals designating the current count in the controllable divider circuit 44. The output terminals of comparator circuit 56, comparator circuit 57, comparator circuit 58, and comparator circuit 59 are each coupled to an input terminal of logic "OR" gate 55.

2. Operation of the Preferred Embodiment

The operation of the preferred embodiment can be understood in the following manner. The reference oscillator 31 provides a signal with a known and constant frequency. For example, the reference oscillator can have a frequency of 250 kHz. If the controllable divider circuit 44 is configured to divide the input frequency by n=80, the system clock signal will be established at a frequency of 20 mHz. If, however, the controllable divider circuit 44 is configured to have a value of n=81, then the system clock signals will be provided at a frequency of 20.25 mHz. Thus, by controlling the configuration of the controllable divider circuit 44, i.e. by controlling the count placed in the count down counter, the frequency of the system clock signals can be varied. When the integer (n−1) is entered in the controllable divider circuit 44, this value is also entered in the divider circuits 52 through 54. In each divider unit, the value of n is divided by an amount determined by the number K of divider units to result in K approximately equal intervals. (The 'approximately equal' intervals result when the quantity n−1 is not exactly divisible by K.) The value of K determines the amount by which the frequency of signals from the reference oscillator 31 is multiplied to indicate the frequency of the signals from the constant frequency source. For example, if the value of K is four and n=80, then the output of the divider circuit 52 will be 20 and this value will be entered in the comparator circuit 57. When the count in the controllable divider circuit 44, reaches 20, then comparator 57 will provide an output signal to logic "OR" gate 55 and this signal will be applied to the output terminal of the logic "OR" gate 55. Similarly, comparator 58 will apply a signal to logic "OR" gate 55 when the count in the controllable divider circuit 44 reaches 40 and comparator circuit 59 will apply a signal to logic "OR" gate 55 when the count reaches 60. Of course, comparator circuit 56 will apply a signal when the count in the controllable divider circuit 44 reaches 0 (80). Thus, it can be seen that the output terminal of logic OR gate 55 will have signals applied thereto that are K times the frequency of the reference oscillator 31. For example, when the frequency of the reference oscillator is 250 kHz and K=4, the frequency of the constant frequency clock source will be 1 mHz. As described above, when the system clock frequency is not exactly divisible by K, the individual intervals can vary slightly. However, at the end of the $K^{th}$ interval, the intervals will be synchronized, i.e. no accumulative error will have resulted with the recycling of the controllable divider circuit 44 because the comparator circuit 56 has the same value, i.e. 0, as does the controllable divider circuit 44. The positioning of the distribution network 21 and the associated time delay is needed to maintain the synchronization of the phase between the constant frequency clock source and the system clock signals. Certain wave-shaping circuits that can be necessary for proper interfacing between components of the clock device are not explicitly shown, being readily identified by one of ordinary skill in the art when the explicitly indicated components have been selected.

It will be clear to those skilled in the art that the description of the phase-locked loop is not complete and that other elements such as a low pass filter can be incorporated in the loop. It will also be clear that the divider circuit 43 is not necessary for the operation of the invention, but can be incorporated for convenience in the implementation of the timing circuit.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Timing apparatus for use in a data processing unit comprising:
   a reference oscillator;
   clock means including a phase locked loop circuit and responsive to said reference oscillator for providing system clock signals having a controllable frequency; and
   constant frequency means coupled to said clock means for providing constant frequency signals that are in phase with said clock signals;
   wherein said system clock signals are provided to the data processing unit through distribution networks, one of said distribution networks being coupled in said phase locked loop.

2. The timing apparatus of claim 1 wherein said constant frequency means includes dividing means for providing an interval signal having a frequency approximately an integer K times the frequency of said reference oscillator.

3. The timing apparatus of claim 1 wherein said dividing means includes a plurality of dividing circuits and associated comparator circuits for determining said interval signal, wherein K is the number of said comparator circuits.

4. The timing apparatus of claim 3 further including a logic "OR" gate, wherein output terminals of said comparator circuits are coupled to input terminals of said logic "OR" gate.

5. The timing apparatus of claim 4 wherein said clock means includes a count down counter, said count down counter responsive to control signals for storing an initial value in said counter.

6. In a data processing system, a method for providing system clock signals having a variable frequency and for providing constant frequency signals to interval timer or related apparatus comprising the steps of:
   providing a signal having a reference frequency;
   applying said reference frequency signal to a phase locked loop circuit;
   dividing an output signal of a voltage controlled oscillator by a controllable dividing circuit coupled in said phase locked loop circuit, a divisor of said controllable dividing circuit being determined by control signals applied thereto, input signals to said controllable dividing circuit providing said system clock signals; and generating a series of signals having at least approximately equal time intervals between each of said series signals determined by selected counts from said controllable dividing circuit, said series signals being said constant frequency signals.

7. The method for providing clocking and constant frequency signals of claim 6 further comprising the step of applying said variable frequency clock signals to distribution networks associated with each unit of said data processing system.

8. The method for providing system clock and constant frequency signals of claim 6 further comprising the step of delaying signals in said phase locked loop by connecting a distribution network associated with a data processing unit in said phase locked loop between a dividing circuit and said controllable dividing circuit.

9. The method for providing system clock and constant frequency signals of claim 8 wherein said generating step further includes the step of applying count signals from said controllable dividing circuit to comparator circuits, said comparator circuits providing output signals determined by said control signals controlling said controllable divider circuit and by a number of said comparator circuits.

10. The method of providing system clock and constant frequency signals of claim 9 wherein said applying step further includes the steps of:
applying said control signals to a plurality of dividing networks; and
applying signals from each of said plurality of dividing networks to associated ones of said comparator circuits.

11. The method of providing system clock and constant frequency signals of claim 10 wherein said generating step provides that said equal time intervals are a multiple of an interval determined by said reference frequency.

12. Timing apparatus for use in a data processing system for providing system clock signals having a controllable frequency and for providing signals having a constant frequency for use in an interval timer or related apparatus comprising:
an oscillator providing a constant reference frequency output signal;
a phase locked loop circuit including:
    a phase comparator unit receiving said constant frequency output signal at a first input terminal;
    a voltage controlled oscillator coupled to said phase comparator unit; and
    a controllable divider circuit for receiving an input signal from said voltage controlled oscillator, said controllable divider circuit responsive to control signals, said control signals determining a divisor of said controllable divider circuit, an output signal of said controllable divider circuit being coupled to a second input terminal of said phase comparator unit; and
a plurality of comparator units receiving a count signal from said controllable divider circuit, each of said plurality of comparator units providing an output signal that is a predetermined fraction of a period determined by said oscillator reference frequency, said output signals from said plurality of comparator units providing said constant frequency signals, wherein said input signal to the controllable divider circuit provides the system clock signals.

13. The timing apparatus of claim 12 further including distribution networks coupling said system clock signals to each portion of said data processing system, each said distribution network producing a preselected delay to each of said portions.

14. The timing apparatus of claim 13 wherein one of said distribution networks is coupled between said voltage controlled oscillator and said controllable divider circuit.

15. The timing apparatus of claim 14 wherein each of said plurality of comparator units includes a divider unit, said divider units receiving said control signals.

16. The timing apparatus of claim 15 wherein said divider units and said control signals determine a frequency of said constant frequency signals.

17. The timing apparatus of claim 13 wherein said controllable divider circuit includes a count down counter, said control signals entering an initial value in said count down counter.

18. The timing apparatus of claim 16 wherein output terminals of said comparator units are applied to a logic "OR" element, an output terminal of said logic "OR" element providing a reference signal for said interval timer.

* * * * *